July 16, 1929. G. G. SCHMIDT 1,721,137
MEASURING DEVICE
Filed July 14, 1926
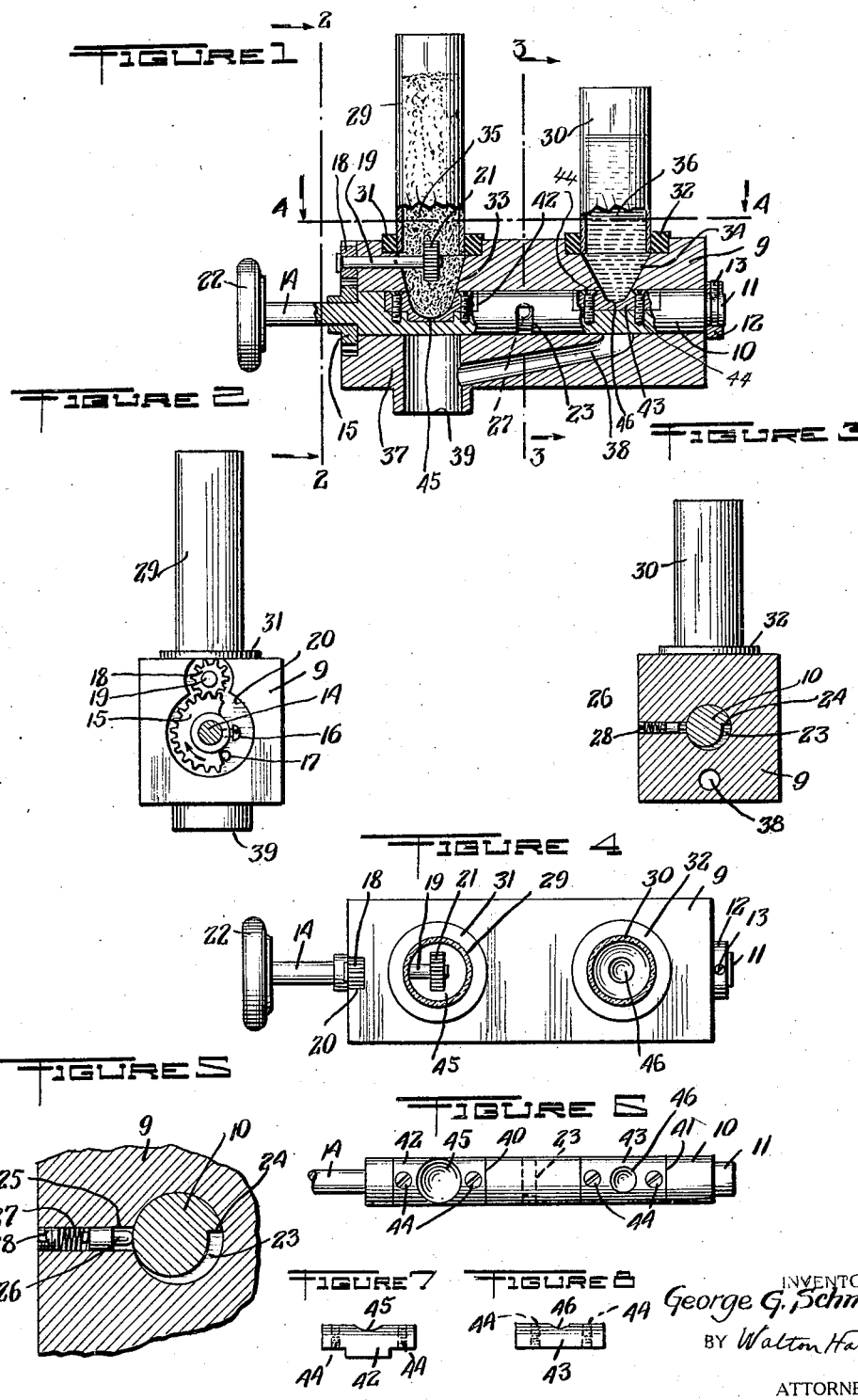

Patented July 16, 1929.

1,721,137

UNITED STATES PATENT OFFICE.

GEORGE GUSTAV SCHMIDT, OF LONG BEACH, NEW YORK.

MEASURING DEVICE.

Application filed July 14, 1926. Serial No. 122,280.

My invention relates to measuring devices, and more particularly to measuring devices for apportioning out relative charges or doses of different materials, such measuring devices being used by dentists, doctors, druggists, manufacturers, and in fact by persons in all professions, trades and avocations, who may be interested in measuring out proportionate quantities of different material.

More particularly stated, I seek to produce a simple device of this general character, complete and self contained, having few parts, and these being of such character as to be easily assembled and readily standardized for quantity production, my device having a number of specific objects as hereinafter set forth completely, and forming the basis of the appended claims.

Reference is made to the accompanying drawing forming a part of this specification, and in which like reference characters indicate like parts throughout the several figures.

Figure 1 is a substantially central vertical section through my device.

Figure 2 is a section on the line 2—2 of Figure 1, looking in the direction indicated by the arrows.

Figure 3 is a section on the line 3—3 of Figure 1, looking in the direction indicated by the arrows.

Figure 4 is a section on the line 4—4 of Figure 1 looking in the direction indicated by the arrows.

Figure 5 is a framentary section similar to a portion of Figure 3, but made upon a larger scale to better illustrate certain details.

Figure 6 is a fragmentary plan of the measuring shaft.

Figure 7 is a plan view of one of the interchangeable measuring sectors.

Figure 8 is a plan view of another one of the interchangeable measuring sectors.

A massive casing 9 serves as a frame and container for other parts, and is preferably formed from a solid block of metal.

Extending lengthwise throughout the casing 9 is a measuring shaft 10, having the general form of a cylinder. This measuring shaft extends through a hole provided for it in the casing, and into which it fits loosely but neatly.

The measuring shaft 10 is provided at one of its ends with a portion 11 of reduced diameter, and fitted upon this portion is a collar 12, held in position by a set screw 13.

The measuring shaft 10 is further provided with a neck portion 14 carrying a small sector 15, held in position by a set screw 16, as indicated more particularly in Figure 2.

The casing 9 carries a stop pin 17, disposed adjacent the sector 15, and serving to prevent undue play of the sector 15 and measuring shaft 10.

Meshing with the sector 15 is a pinion 18, mounted fixedly upon a shaft 19, which is revolubly supported by the casing.

The casing 9 is further provided with a shallow opening 20 of the form shown in Figure 2, for housing the sector 15 and the pinion 18.

The shaft 19 carries a stirring wheel 21, secured rigidly upon it and thus adapted to turn or rock with it.

The measuring shaft 10 is provided with a knob 22, carried upon the neck 14, and actuated by hand for the purpose of rocking the measuring shaft. The measuring shaft 10 is rocked back and forth within limits permitted by the stop pin 17, as may be understood from Figure 2.

The measuring shaft 10 is also provided with a slot 23, having a general arcuate form and a varying depth, as indicated in Figure 5, one end of the slot being bounded by a shoulder 24.

The casing 9 is provided with a passage 25, and fitting into this passage is a pawl 26, a spring 27 and a screw plug 28, the latter engaging the spring 27 and forcing it against the pawl 26. Each time the measuring shaft 10 is turned to the limit of its travel in a clockwise direction according to Figures 3 and 5, the pawl 26, under pressure of the spring 27, extends into the slot 23 and is engaged by the shoulder 24. When this movement of the measuring shaft 10 is performed quickly and with a little force, the shoulder 24 lodges rather hard against the pawl 26, the measuring shaft thus being brought abruptly to a stop, and a slight jar is communicated to the entire apparatus. This slight jarring effect is used, as hereinafter more fully described, for the purpose of releasing the materials measured, and facilitating their discharge.

Detachably mounted upon the casing 9 are hoppers 29, 30, in this instance two in number. These hoppers are made of glass, celluloid, or other material more or less transparent, and while in use are held in position by gaskets 31 and 32 of resilient material, preferably soft rubber. Below these gaskets, the casing is provided with passages 33, 34. These passages and the hoppers above them normally contain quantities of the materials 35 and 36 which are to be measured. Many kinds of material may be thus contained and measured by my device, and I do not limit myself to any particular kinds of material. However, for convenience, in this particular instance the material 35 is powdered alloy of the general kind used by dentists in filling teeth, and the material 36 is mercury, commonly used in connection with the alloy 35 for making the fillings. Owing to the transparency of the hoppers, the operator can see the materials they contain, and thus the more readily determine the condition of their contents.

The casing 9 is provided with discharge passages 37 and 38, the passage 38 merging into passage 37, and being longer and smaller than the latter, the two passages thus merging into a discharge opening 39.

The measuring shaft 10 is further provided with a pair of slots 40 and 41, each having the shape of a sector. I provide a number of separate sectors 42 and 43, made preferably of hard rubber, each sector being so formed and having such proportions as to enable it to be detachably connected with the measuring shaft 10, by fitting the sector into the slot 40 or 41, and securing it in position by means of screws 44. The sectors are provided with openings 45, 46, having the form of pockets for measuring the charges or doses.

Whenever the operator wishes to change the quantity of material to be measured out, or in other words to vary the size of the charge or dose, he removes one or both of the sectors and substitutes one or more other sectors in their place or places, thus adapting the measuring shaft for the dosage required.

The operation of my device is as follows:

The various parts being formed and arranged as shown in the drawing and as above described, the operator changes the sectors 42 and 43 if necessary, and fills the hoppers 29 and 30 with the materials to be measured.

He can leave the apparatus in this condition for any length of time, that is, ready for immediate use.

Whenever he is ready to operate the device, he places it over a receptacle for receiving the materials as measured out, or he can hold it in his hand for this purpose. He now grasps the knob 22, and turns it quickly in a clockwise direction. The shoulder 24, shown more particularly in Figures 3 and 5, is thus brought abruptly against the pawl 26 which glides into the slot 23, so that a slight shock is communicated to the entire apparatus. The measuring shaft 10 thus makes a rocking movement in one direction, and is brought abruptly to a stop.

The sectors 42 and 43, with their openings 45 and 46, serve essentially as measuring cups. The openings 45 and 46 are at the start automatically filled with the materials 35 and 36; the rocking of the shaft measures off charges of these materials, and these charges are dropped downwardly into the passages 37 and 38. The charge of mercury, having now the form of one or more globules dropped into the passage 38, follows this passage into the passage 37, into which the charge of alloy is also dropped, the entire mass now passing out as a unit through the discharge opening 39.

I do not limit myself to the precise construction shown, as variations may be made therein without departing from my invention, the scope of which is commensurate with my claims.

Having described my invention, what I claim as new and desire to secure by Letters Patent is as follows:

1. In a measuring device the combination of a casing for holding a portion of loose material, a shaft carried by said casing and journaled to rock relatively to said opening, said shaft having substantially the form of a cylinder and being provided with a slot, and a plurality of sectors fashioned to fit into said slot, said sectors each having a pocket, the pocket of one sector differing in size from the pocket of another sector, said sectors being interchangeable one for another in order to vary the quantities of the loose material measured, said sectors when carried by said shaft being each movable into and out of communication with said opening.

2. In a measuring device the combination of a casing provided with an opening for holding a portion of loose material, a shaft of substantially cylindrical form carried by said casing and journaled to rock, said shaft being provided with a slot, and a plurality of separate sectors interchangeable relatively to each other and thus adapted to be fitted one at a time into said slot and to be carried therein by said shaft during the rocking thereof, each of said separate sectors having a pocket which, as said shaft is turned, is moved into and out of communication with said opening.

Signed at New York City, in the county of New York and State of New York, this 12th day of July, 1926.

GEORGE GUSTAV SCHMIDT.